United States Patent
Edatsune et al.

(10) Patent No.: US 7,066,665 B2
(45) Date of Patent: Jun. 27, 2006

(54) PRINTING APPARATUS AND PRINTING METHOD

(75) Inventors: Isao Edatsune, Nagano (JP); Tatsuya Kitazawa, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 10/805,485

(22) Filed: Mar. 22, 2004

(65) Prior Publication Data

US 2004/0240920 A1    Dec. 2, 2004

Related U.S. Application Data

(63) Continuation of application No. 10/029,155, filed on Dec. 28, 2001, now Pat. No. 6,719,466, which is a continuation of application No. PCT/JP01/03800, filed on May 1, 2001.

(30) Foreign Application Priority Data

Apr. 28, 2000  (JP) ............................ P.2000-130050
Apr. 28, 2000  (JP) ............................ P.2000-131007

(51) Int. Cl.
*B41J 5/30*  (2006.01)
(52) U.S. Cl. .............................. 400/61; 400/62; 400/76
(58) Field of Classification Search .................. 400/61, 400/62, 70, 76; 358/1.2, 1.6, 1.9, 1.11–1.18
See application file for complete search history.

(56) References Cited

U.S. PATENT DOCUMENTS

| | | | |
|---|---|---|---|
| 6,411,361 B1 * | 6/2002 | Hidaka et al. | 355/40 |
| 6,504,960 B1 | 1/2003 | Takahashi | |
| 6,867,882 B1 * | 3/2005 | Takahashi | 358/1.6 |

FOREIGN PATENT DOCUMENTS

| | | | |
|---|---|---|---|
| JP | 03102513 A | * | 4/1991 |
| JP | 6-8537 | | 1/1994 |
| JP | 6-238958 | | 8/1994 |
| JP | 7-61054 | | 3/1995 |
| JP | 8-272990 | | 10/1996 |
| JP | 10-226117 | | 8/1998 |
| JP | 11-317921 | | 11/1999 |
| JP | 2000-118086 | | 4/2000 |
| JP | 2003046762 A | * | 2/2003 |

* cited by examiner

*Primary Examiner*—Minh Chau
(74) *Attorney, Agent, or Firm*—Sughrue Mion, PLLC (57) ABSTRACT

Since both an output setting value and an output subject identifier, which are contained by a setting program, are stored as one record into a drawing table, an output condition such as a layout of image data which is designated when a printing operation is carried out can be previously set before the printing operation is carried out. Since photograph numbers of image data stored in a memory card are defined in relation to output subject identifiers, such image data to be printed out can be designated.

26 Claims, 6 Drawing Sheets

PRINTING APPARATUS AND PRINTING METHOD

This is a continuation of application Ser. No. 10/029,155 filed Dec. 28, 2001, now U.S. Pat. No. 6,719,466; which is a continuation of International Application No. PCT/JP01/03800, whose International filing date is May 1, 2001, which was published under PCT Article 21(2) in Japanese. The disclosure of both applications is incorporated herein by reference.

BACKGROUND OF THE INVENTION

The present invention relates to a printing apparatus for printing images based on image data.

Recently, so-called "stand-alone printers" capable of producing photographic images by itself without being connected to personal computer (personal computer will be referred to as "PC" hereinafter) have become commonplace. The stand-alone printers are constituted by reading apparatus and operation panels. The reading apparatus is employed so as to read auxiliary media adapted to communicate with such information processing systems as memory cards on which photographic image data are recorded. The operation panels are employed in order to set such printing conditions as print paper sizes for these photographic image data.

Since such stand-alone printers can print out without being connected to PC, users who have no such PC can print out photographic images on printing media, while these photographic images are photographed by digital cameras.

In accordance with general-purpose file systems for digital cameras, character data such as photographing data/time are stored as attribute information of image data into storage media. Such character data may be read out from the recording media in combination with the image data when the printing operation is carried out, and then, can be printed out in combination with these image data. For instance, in the case that image data are outputted in an album form, and in such a case that an index of images which are recorded on a recording medium is formed, such character data as photographing date/time which are printed out in combination with the images may constitute useful information for users.

However, image data, acquired in a file formed by executing an image edit application program is data acquired by a PC when the file is formed. Accordingly, the image data to be printed out cannot be acquired by the stand-alone printer when a printing operation is carried out without specifying the image data to be printed out when the file is formed. In other words, in accordance with the related image edit application program unless the image data to be printed out is specified, an output condition in a printing apparatus cannot be determined with respect to such unspecified image data. Namely, a printing position, either an enlarging ratio or a reduction ratio, or a filtering process operation cannot be designated with respect to image data acquired without specifying the image data to be printed out in the stand-alone printer. Unless the image data to be printed out is specified, the stand-alone printer cannot determine as to whether or not attribute information such as photographing date/time is printed out when the image data is outputted.

In a related printing apparatus, in a printing subject file in which an output condition such as a layout is determined with respect to image data, such image data to be printed out cannot be designated on the side of this related printing apparatus, or cannot be changed on the side of the related printing apparatus.

Generally, when a stand-alone printer has such a function capable of causing an operator to select as to whether or not character data such as photographing date/time is printed out, there is such a problem that an operation panel of this stand-alone printer owns a complex construction.

SUMMARY OF THE INVENTION

An object of the present invention is to provide a printing apparatus and a printing method, capable of previously setting an output condition such as a layout of image data designated when a printing operation is carried out before the printing operation is performed.

Another object of the present invention is to provide a printing apparatus and a printing method, capable of designating, or changing image data to be printed out in a printing subject file in which an output condition such as a layout is determined with respect to image data.

Another object of the present invention is to provide a printing apparatus and a printing method, capable of previously setting an output condition of character data belonging to image data which is designated during a printing operation, before image data to be outputted is designated.

Another object of the present invention is to provide a printing apparatus and a printing method, capable of designating, or changing image data to be printed out in a printing subject file in which an output condition of character data belonging to image data is determined.

In the beginning, implication of terminology used in this specification will now be explained.

A term "output subject identifier" is a data for linking both image data acquired by a printing apparatus and such data used to define character data to an output setting value.

A term "image output setting value" is a value for determining a content of a process operation executed by the printing apparatus with respect to image data every such image data to be outputted. This process operation includes a process operation for determining a position of an image on a printing medium, a dimension of this image, and a shape of this image which is printed on the printing medium; a trimming process operation; a filtering process operation; a rotating process operation, and the like.

A term "drawing data region" is a region which is secured in an address space of the printing apparatus, for instance, a region of such an address space in which a data set of a list and a table, which are constituted by drawing data, is arranged.

A term "work area" is a region secured in an address space of the printing apparatus, namely such a region which temporarily stores data processed by executing a predetermined process by a processing apparatus.

A term "printing image data" is data which is produced by the processing apparatus based upon image data, namely the printing apparatus directly refers to data when the printing apparatus is mechanically operated so as to print out an image.

A term "image retrieve region" is a region which is secured in an address space of the printing apparatus, for instance, a region of such an address space in which a data set of a table, which are constituted by image data and an output subject identifier, is arranged.

A term "reference printing frame" is a frame which constitutes a reference used to determine as an output condition, a shape of an image printed out based on image data, a dimension of the image, and a position of the image on a printing medium. The reference printing frame may be made of any sorts of frames from which images are not projected on a printing medium. This reference printing frame need not owns the following condition. That is, a region on a printing medium, which is surrounded by this reference printing frame, is not completely made coincident with another region where a printed image occupies on the printing medium.

A term "trimming process operation" corresponds to such a process operation capable of obtaining an image having a specific shape by deleting pixels which are distributed in a peripheral region of an image.

A term "filtering process operation" corresponds to such an image processing operation as a density conversion, a sharpening process, and a smoothening process, which are executed with respect to image data.

A term "character output setting value" corresponds to such a value used to determine a sort of information which constitutes a printing subject contained in character data, or a value used to determine a font, a font size, a printing position of character data. For instance, the character output setting value corresponds to a value used to determine the following item based upon such character data indicative of a photographing year, a photographing month, photographing time, a shutter speed, an exposure value, which are recorded by a file system designed by a predetermined specification: "a field value indicative of a shutter speed is read, and the field value is printed on a lower right portion of paper by the courier new font of 12 points."

A first printing apparatus of the present invention is provided with a drawing data storage unit, an input unit, an image data acquiring unit, an image processing unit, and a printing unit, which will be explained in the below-mentioned items (1) to (5):

(1) The drawing data storage unit acquires both an output setting value and an output subject identifier linked to the output setting value via an input interface, and produces drawing data containing both the output setting value and the output subject identifier to be stored in a drawing data region. The drawing data storage unit is constituted by a processing apparatus for executing a predetermined process.

Both the output setting value and the output subject identifier are acquired from, for example, an auxiliary recording apparatus connected to an input interface, and a computer connected via a communication cable to the input interface.

(2) The input unit inputs an identifier of image data which is recorded on an auxiliary recording medium and is mutually communicable between information processing systems in relation to the output subject identifier stored in the drawing data region. The input unit is constituted by, for example, a processing apparatus for executing a predetermined process, and an input apparatus such as a selection value inputting apparatus. For instance, the processing apparatus supplies identifiers of all of image data which are recorded on the auxiliary recording medium, and the selection value inputting apparatus causes a user to selectively input any one of the received identifiers, and then supplies the inputted identifier to the processing apparatus. Then, the processing apparatus defines the received identifier in relation to the output subject identifier.

(3) The image data acquiring unit acquires the drawing data from the drawing data region, in which image data which is specified while the identifier of the image data related to the output subject identifier is used as a retrieve key is transferred from the auxiliary recording medium via the input interface to a work area. The image data acquiring unit is arranged by, for instance, a reading apparatus of an auxiliary recording medium, and a processing apparatus for executing a predetermined process operation.

(4) The image processing unit produces printing image data from the image data of the work area by employing the output setting value of the drawing data derived from the drawing data region. The image processing unit is arranged by a processing apparatus for executing a predetermined process operation. The output setting value is applied to such a parameter to which the processing apparatus refers in the case that an image produced based upon image data is converted into another image which is expressed in a coordinate system allocated to a printing medium. For instance, the output setting value is applied to such a parameter to which the processing apparatus refers while this processing apparatus calculates the determine that a certain pixel is arranged at which position on a printing medium.

(5) The printing unit prints out an image on the printing medium based upon the printing image data. The printing unit is constituted by, for example, a printer engine equipped a paper transport mechanism, an ink jetting head, a head drive mechanism, a control board, and so on.

In accordance with the printing apparatus of the present invention, since the printing subject file in which the output condition such as the layout is determined is executed, the drawing data is produced from both the output setting value and the output subject identifier, which are contained by the printing subject file. As a result, the output condition such as the layout of the image data, which is designated during the printing operation, can be previously set before the printing operation is carried out. Also, since the image data stored in the auxiliary recording medium are defined in relation to the output subject identifiers, the image data to be printed out can be designated. Since the relationship between the output subject identifiers and the image data stored in the auxiliary recording medium are changed, the image data to be printed out can be changed in the printing subject file.

In accordance with the printing apparatus of the present invention, in the case that an output subject identifier which has not yet been stored in the drawing data region is newly acquired via the input interface, the data storage unit defines the output subject identifier not yet stored in the drawing data region in related to an identifier of predetermined image data, and stores the related output subject identifier into an image retrieve region. The input unit defines an identifier of image data recorded on the auxiliary recording medium in relation to the output identifier by rewriting the identifier of the image data stored in the image retrieve region.

In accordance with the printing apparatus of the present invention, the identifiers of the image data are defined in relation to the output subject identifiers by the image retrieve region. As a consequence, according to the printing apparatus of the present invention, since the image data related thereto by the image retrieve region can be acquired from the auxiliary recording medium, the repeated (duplicated) output subject identifier may be acquired, and then, a plurality of images may be printed out based upon one image data in accordance with the different output setting values which are related to the duplicated output subject identifier.

According to the printing apparatus of the present invention, the image processing apparatus applies the image output setting value of the drawing data to a parameter used to determine a position of a reference printing frame, a dimension thereof, and a shape thereof, so that the position, the dimension, and the shape on the printing medium for printing out the image can be previously set before the image to be printed out is specified.

According to the printing apparatus of the present invention, the image processing apparatus applies the image output setting value of the drawing data to a parameter used to enlarge, compress, or trim the image produced based upon the image data in order to allocate the image produced based upon image data of the work area to the reference printing frame. As a consequence, the position, the dimension, and the shape on the printing medium for printing out the image can be previously set before the image to be printed out is specified.

According to the printing apparatus of the present invention, the image processing apparatus applies the image output setting value of the drawing data to a parameter used to execute a filtering process operation with respect to the image data of the work area. As a result, the filtering process operation which is performed to the image during the printing operation can be previously set.

A second printing apparatus of the present invention is provided with a drawing data storage unit, an input unit, an image data acquiring unit, an image processing unit, and a printing unit, which will be explained in the below-mentioned items (1) to (5):

(1) The drawing data storage unit acquires an output subject identifier, and both an image output setting value and a character output setting value, which are defined in relation to the output subject identifier via an input interface, and produces drawing data which contains the output subject identifier, the image output setting value, and the character output setting value to be stored into a drawing data region. The drawing data storage unit is arranged by a processing apparatus for executing a predetermined process. Both the output setting value and the output subject identifier, and also the character output setting value are acquired from, for example, an auxiliary recording apparatus connected to an input interface, and a computer connected via a communication cable to the input interface. It should be understood that the output subject identifier, the image output identifier, and the character subject identifier may properly change expression formats of implication contents indicated by these values in the execution stages of the process operation in the printing apparatus.

(2) The input unit inputs an identifier of image data which is recorded on an auxiliary recording medium and is mutually communicable between information processing systems is inputted in relation to the output subject identifier stored in the drawing data region. The input unit is arranged by, for example, a processing apparatus for executing a predetermined process, and also a key input apparatus such as a selection value inputting apparatus. For instance, the processing apparatus supplies identifiers of all of image data which are recorded on the auxiliary recording medium, and the selection value inputting apparatus causes a user to selectively input any one of the received identifiers, and then supplies the inputted identifier to the processing apparatus. Then, the processing apparatus defines the received identifier in relation to the output subject identifier.

(3) The image data acquiring unit transfers both image data which is specified while the identifier of the image data related to the output subject identifier is used as a retrieve key, and also character data belonging to the image data from the auxiliary recording medium via the input interface to a work area. The image data acquiring unit is arranged by, for instance, a reading apparatus of an auxiliary recording medium, and a processing apparatus for executing a predetermined process operation.

(4) The image processing unit produces first printing image data from the image data of the work area by employing the image output setting value, and also produces second printing image data from the character data of the work area by employing a character output setting value. The image processing unit is arranged by a processing apparatus for executing a predetermined process operation. The image output setting value is applied to such a parameter to which the processing apparatus refers in the case that image data is converted into printing image data which is expressed in a coordinate system allocated to a printing medium. For instance, the image output setting value is applied to such a parameter to which the processing apparatus refers while this processing apparatus calculates to determine that a certain pixel is arranged at which position on a printing medium. In the case that the character data belonging to the image data is converted into the printing image data expressed in the coordinate system allocated to the printing medium, the character output setting value is applied to the parameter to which the processing apparatus refers. For example, the character output setting value is applied to such a parameter for indicating that any one of the field values of the character data belonging to the image data is derived to be printed out, or and also is applied to such a parameter for determining a font, a font size, and a printing position.

(5) The printing unit prints out an image on a printing medium based upon both the first printing image data and the second printing image data. The printing unit is constituted by, for example, a printer engine equipped a paper transport mechanism, an ink jetting head, a head drive mechanism, a control board, and so on.

In accordance with the printing apparatus of the present invention, since the printing subject file in which the output condition such as the layout is determined is executed, the drawing data is produced from the image output setting value and the output subject identifier and also the character output setting value, which are contained by the printing subject file. As a result, the output condition of the character data belonging to the image data, and also, the output condition such as the layout of the image data, which is designated during the printing operation, can be previously set before the printing operation is carried out. Also, since the image data stored in the auxiliary recording medium are defined in relation to the output subject identifiers, the image data to be printed out can be designated. Since the relationship between the output subject identifiers and the image data stored in the auxiliary recording medium are changed, the image data to be printed out can be changed in the printing subject file.

In accordance with the printing apparatus of the present invention, in the case that an output subject identifier which has not yet been stored in the drawing data region is newly acquired via the input interface, the data storage unit stores the output subject identifier not yet stored in the drawing data region into an image retrieve region. The input unit defines an identifier of image data recorded on the auxiliary recording medium in relation to the output identifier to input the identifier of the related image data.

In accordance with the printing apparatus of the present invention, the identifiers of the image data are defined in relation to the output subject identifiers by the image retrieve region. As a consequence, according to the printing apparatus of the present invention, since the image data related thereto by the image retrieve region can be acquired from the auxiliary recording medium, the repeated (duplicated) output subject identifier may be acquired, and then, a plurality of images may be printed out based upon one image data in accordance with the different output setting values which are related to the duplicated output subject identifier, and also the character data belonging to this image data.

According to the printing apparatus of the present invention, the image processing unit applies the character output setting value to a parameter used to determine a field of character data in which the second printing image data is produced. As a result, the image processing unit can previously set as to whether or not any one of the field values of the character data belonging to the image data is derived to be printed out, before the image data to be printed out is designated.

According to the printing apparatus of the present invention, the image processing unit applies the character output setting value to a parameter used to determine a font of the second printing image data. As a result, the image processing unit can previously set as to whether or not the character data belonging to the image data is printed out by employing which font, before the image data to be outputted is designated.

According to the printing apparatus of the present invention, the image processing unit applies the character output setting value to a parameter used to determine a font size of the second printing image data. As a result, the image processing unit can previously set as to whether or not the character data belonging to the image data is printed out by employing which font size, before the image data to be outputted is designated.

According to the printing apparatus of the present invention, the image processing unit applies the character output setting value to a parameter used to determine a printing position of the second printing image data. As a result, the image processing unit can previously set as to whether or not the character data belonging to the image data is printed out by on which position of the printing medium, before the image data to be outputted is designated.

DETAILED DESCRIPTION OF PREFERRED EMBODIMENTS

Figure 2:
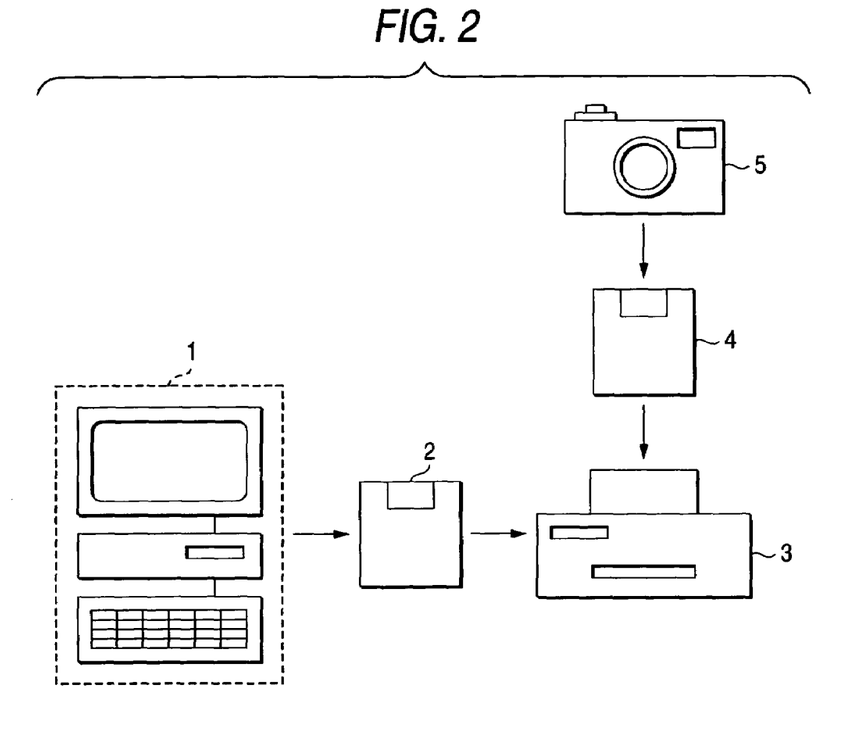
FIG. 2 is a schematic diagram for representing a printing system arranged by the printing apparatus according to the embodiment of the present invention.

An embodiment for representing an embodiment mode of the present invention will be described with reference to the drawings. As shown in FIG. 2, a printing apparatus 3, according to an embodiment of the present invention, constitutes such a printing system stores a setting program produced by a program editing apparatus 1 into a first memory card 2, changes an initial setting output condition of the printing apparatus 3 by causing the printing apparatus 3 to read out and execute this setting program of the first memory card 2, and then, image data recorded by a digital camera 5, which are stored in a second memory card 4 based upon the changed output condition.

Figure 3:
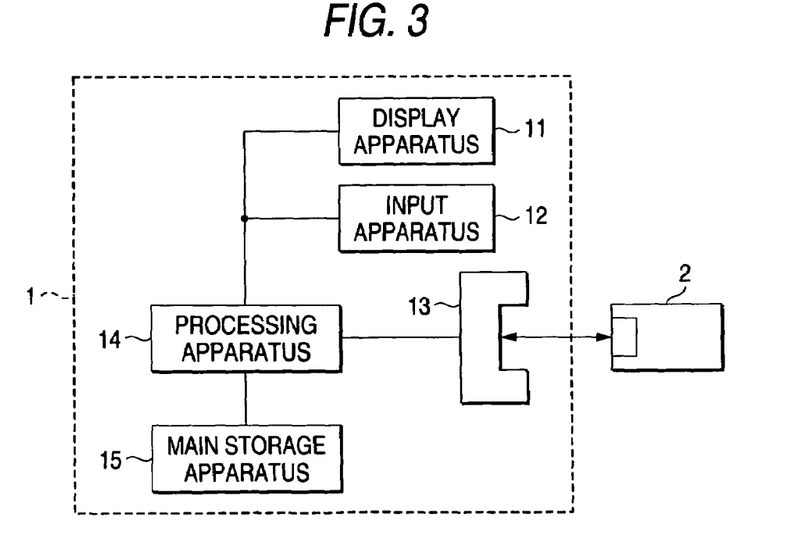
FIG. 3 is a block diagram for showing a program editing apparatus according to an embodiment of the present invention.

FIG. 3 shows a construction of the program editing apparatus 1. The program editing apparatus 1 is constituted by a processing apparatus 14, a main storage apparatus 15, a display apparatus 11, an input apparatus 12, and a memory card reading/writing apparatus 13.

The processing apparatus 14 executes an edit program (will be referred to as an "editor" hereinafter) stored in the main storage apparatus 15 so as to execute a predetermined process operation in response to an instruction inputted from the input apparatus 12.

The display apparatus 11 displays thereon an edited content of the setting program in an easily understandable manner by displaying a predetermined input screen.

The input apparatus 12 is constituted by a mouse and a keyboard. The mouse may move both a pointer and a cursor, which are indicated on the input screen by the display apparatus 11. The input apparatus 12 accepts an input operation for describing the setting program.

In the main storage apparatus 15, the setting program is produced by executing the editor. The memory card reading/writing apparatus 13 stores the setting program produced in the main storage apparatus 15 into the first detachable memory card 2.

Figure 4:
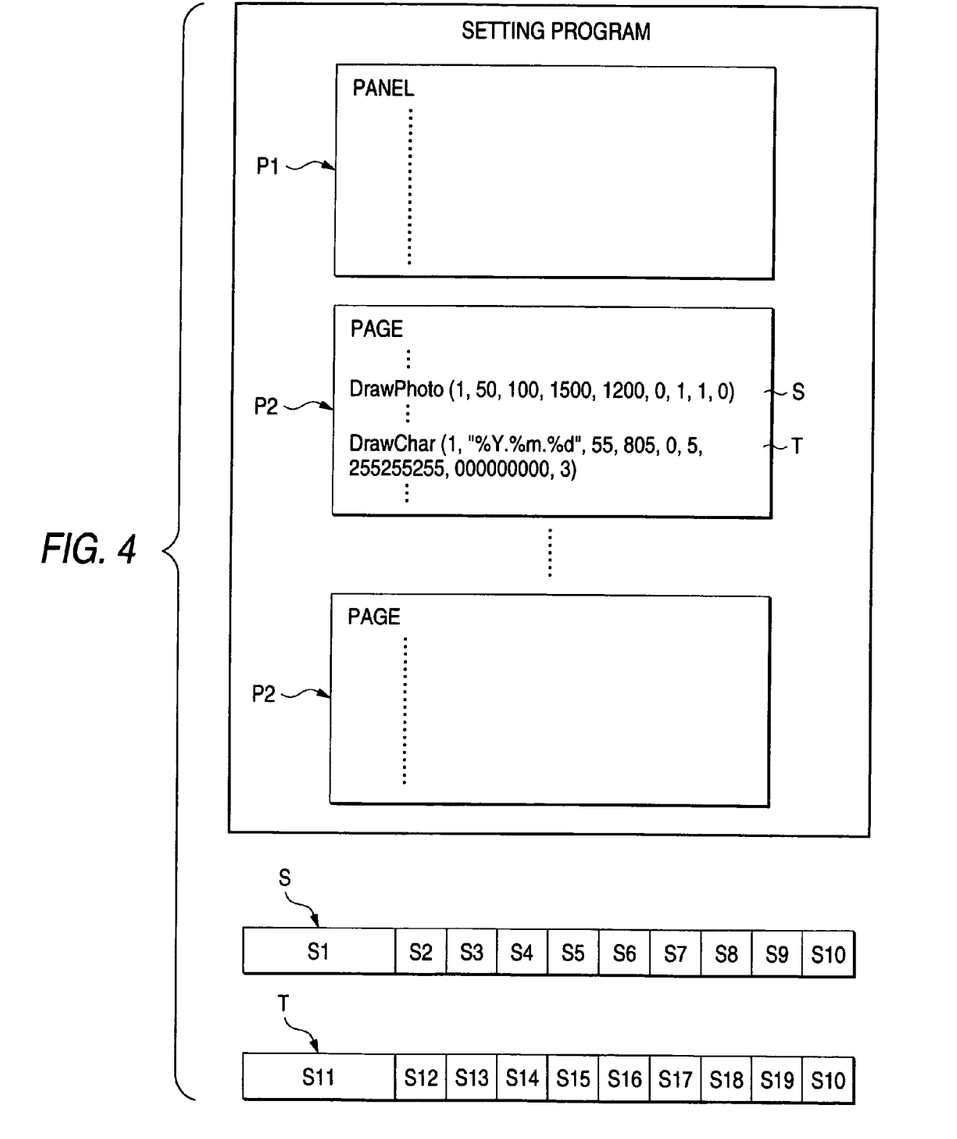
FIG. 4 is a schematic diagram for indicating a setting program according to an embodiment of the present invention.

Next, the setting program which is produced by the program editing apparatus 1 will now be described with reference to FIG. 4. The setting program is constituted by both a printing condition section "P1" in which a printing condition is described, and one or more page sections "P2." It should be understood that the expression "printing condition" in this embodiment is related to such a condition for setting paper among the output conditions of the printing apparatus. For instance, such an expression "print out on glossy paper exclusively-designed for A4-paper size" implies such a printing condition. Another expression "print out by enlarging image by magnification of 120% along longitudinal direction and by magnification of 110% along lateral direction" implies the output condition, but does not imply the printing condition.

A code "PANEL" indicative of a head of the printing condition section P1 is described on a head of the printing condition section P1. A statement described in the printing condition section P1 is to set, to the printing apparatus, such a printing condition as a paper size and a printing quality by being executed by the printing apparatus 3.

A code "PAGE" indicative of a head of a page section P2 is described on a head of each of the page sections P2. A statement described in one page section P2 is sequentially executed by the processing apparatus of the printing apparatus 3, so that an output setting value which is required for producing one page of printing image data is stored in the processing apparatus of the printing apparatus. Since such an output setting value is stored in the processing apparatus, the output condition other than the printing condition is set to the printing apparatus.

Among the statements described in the page sections "P2", a statement "S" is constituted by the below-mentioned fields "S1" to "S10." This statement "S" is executed by the processing apparatus of the printing apparatus so as to set a reference printing frame.

S1; a field containing a mnemonic code in a field value,

S2; a field containing an output subject identifier in a field value,

S3; a field containing an x coordinate of an upper left angle of a reference printing frame in a field value, S4; a field containing a y coordinate of an upper left angle of a reference printing frame in a field value, S5; a field containing an x coordinate of a lower right angle of a reference printing frame in a field value, S6; a field containing a y coordinate of a lower right angle of a reference printing frame in a field value, S7; a field containing a value indicative of a rotation angle during allocation in a field value, S8; a field containing a value indicative of a fitting rule in a field value, S9; a field containing a value indicative of an alignment rule in a field value, and S10; a field containing a value indicative of a filtering process operation in a field value.

A mnemonic code "DrawPhoto" indicative of a statement for setting a reference printing frame includes as parameters, an identifier, x and y coordinates of both as upper left angle and a lower right angle of a reference printing frame, a value indicative of a rotation angle during allocation, a value indicative of a fitting rule, a value indicative of an alignment rule, and a value indicative of a sort of filtering process operation. Now a description will be made of functions of these parameters will be explained.

(1) Output Subject Identifier:

The value of this parameter is employed so as to designate such image data which is allocated to the reference printing frame in the printing apparatus 3. A natural number is designated for the output subject identifier, and the discontinued number is not allowed in the entire setting program. In the case that there are plural reference printing frames within one setting program, output subject identifiers of the plural reference printing frames may be overlapped with each other. The same image data are allocated to such reference printing frames whose output subject identifiers are identical to each other.

(2) x/y Coordinates of Upper Left Angle and Lower Right Angle of Reference Printing Frame:

The values of these parameters (correspond to image output setting values as recited in claims) are expressed by employing such a coordinate system in which an upper left angle of a printable region in a printing paper is employed as a origin. A photographic image is allocated within rectangular regions which are specified by these parameters.

(3) Value Indicative of Rotation Angle During Allocation:

The value of this parameter (corresponds to an image output setting value as recited in claims) is used to determine such a rotation angle by which an image is rotated to be allocated to the reference printing frame. This parameter value employs anyone of values "0" to "3". The rotation angles corresponding to the respective values are defined as follows:

0; no rotation,

1; an image is rotated by 90 degrees,

2; an image is rotated by 180 degrees, and

3; an image is rotated by 270 degrees.

(4) Value Indicative of Fitting Rule:

The value of this parameter (corresponds to an image output setting value as recited in claim) and employs any one of value "0" to "2." In the case that an aspect ratio of a reference printing frame is not identical to an aspect ratio of image data, this fitting-rule-indicating value causes the printing apparatus to execute any one of the below-mentioned process operations:

0; a photographic image is enlarged, or reduced in such a manner that at least two edges of the photographic image are overlapped with a reference printing frame and this photographic image is projected from the reference printing frame without changing an aspect ratio of the photographic image, and since the projected portions of the photographic image are trimmed, the four edges of the photographic images are overlapped with the printing frame, 1; a photographic image is enlarged, or reduced in such a manner that at least two edges of the photographic image are overlapped with a reference printing frame, and this photographic image may be stored into the reference printing frame without changing an aspect ratio of the photographic image, and 2; a photographic image is enlarged, or reduced in such a manner that four edges of the photographic image are overlapped with a reference printing frame without any trimming, while an aspect ratio of the photographic image is changed.

(5) Value Indicative of Alignment Rule:

The value of this parameter (corresponds to an image output setting value as recited in claims) is used to determine such that which coordinate is allocated as a reference when a photographic image is allocated to a reference printing frame. This parameter value employs any one of values from 0 to 8. The allocation methods corresponding to the respective values are defined as follows:

0; a photographic image is allocated in such a manner that a center of an upper portion of a reference printing frame is overlapped with a center of an upper portion of the photographic image.

1; a photographic image is allocated in such a manner that a center of a reference printing frame is overlapped with a center of the photographic image.

2; a photographic image is allocated in such a manner that a center of a lower portion of a reference printing frame is overlapped with a center of a lower portion of the photographic image.

3; a photographic image is allocated in such a manner that an upper left angle of a reference printing frame is overlapped with an upper left angle of the photographic image.

4; a photographic image is allocated in such a manner that a center of an left edge of a reference printing frame is overlapped with a center of a left edge of the photographic image.

5; a photographic image is allocated in such a manner that a lower left angle of a reference printing frame is overlapped with a lower left angle of the photographic image.

6; a photographic images allocated in such a manner that an upper right angle of a reference printing frame is overlapped with an upper right angle of the photographic image.

7; a photographic image is allocated in such a manner that a center of a right edge of a reference printing frame is overlapped with a center of a right edge of the photographic image.

8; a photographic images allocated in such a manner that a lower right angle of a reference printing frame is overlapped with a lower right angle of the photographic image.

(6) Value Indicative of Filter Number:

The value of this parameter (corresponds to an image output setting value as recited in claims) is used to determined such a filtering process operation which is carried out with respect to a photographic image allocated to a reference printing frame. Filtering functions provided with the printing apparatus 3 are designated by way of any integer starting from 1. When this value indicative of the filtering number is equal to "0", this filtering number designates that no filtering process operation is carried out.

As explained above, the functions of the parameters of the statements for setting the reference printing frames have been described.

A statement "T" among the statements described in the page section "P2" is constituted by the below-mentioned fields "S11" to "S19", and this statement "T" is executed by the processing apparatus of the printing apparatus so as to set an output condition of character data belonging to image data:

S11; a field containing a mnemonic code in a field value,
S12; a field containing an output subject identifier in a field value,
S13; a field containing a character string for determining a printing subject field in a field value,
S14; a field containing a value for determining a printing position of a character in a field value,
S15; a field containing a value for determining a rotation angle of a character in a field,
S16; a field containing a value for determining a font size of a character in a field value,
S17; a field containing a value for determining a color of a character in a field,
S18; a field containing a value for determining a background color of a character in a field value, and
S19; a field containing a value for determining a font of a character in a field.

A mnemonic code "DrawChar" indicative of statement for setting output condition of the character data belonging to the image data owns the values of the above-described respective fields S11 to S19 as parameters. Next, functions of these parameters will now be explained.

(1) Output Subject Identifier:

This parameter value is used to designate such image data in the printing apparatus 3, and this image data belongs to character data to be printed out. A natural number is designated to the output subject identifier. Also, in such a case that a plurality of reference printing frames are present in one setting program, these output subject identifiers of such a plurality of reference printing frames may be overlapped with each other. A plurality of character strings are printed out from character data corresponding to such output subject identifiers duplicated (repeated) with each other.

(2) Character String Used to Determine Printing Subject Field:

This parameter value (corresponds to a character output setting value as recited in claims) is employed so as to determine as to whether or not any of these fields is printed by character data belonging to such image data to be printed out. A character string for determining a printing subject field is constructed of a macro variable defined in the printing apparatus 3. For instance, symbol "%" which is described in a statement for setting an output condition of character data in the printing apparatus 3 is used to call a macro variable which is defined by a character arranged subsequent to the symbol "%". Assuming now that symbol "m" is used to define such a macro variable for acquiring a value from a photographing month field of character data belonging to image data, when symbol "% m" is described in a field of S13, such a value indicative of the photographing month is acquired from the character data belonging to the image data by the macro variable.

In the below-mentioned description, in the printing apparatus 3, symbol "%" is used to call the macro variable which is defined by the character arranged subsequent to this symbol "%", and symbols "Y", "m", "D", "H", and "M", which are arranged subsequent to the symbol "%", are so assumed that such macro variables are defined by which "photographing year", "photographing date", "photographing time (hour)", and "photographing time (minute)" are acquired from the respective fields of the character data belonging to the image data.

(3) Value Used to Determine Printing Position:

This parameter value (corresponds to a character output setting value as recited in claims) is indicated by employing a coordinate system in which an upper left angle of a printable region in a printing paper is set as an origin. Character strings are printed on a printing paper while a position specified by this parameter is located at a center.

(4) Value Used to Determine Rotation Angle of Character:

This parameter value (corresponds to a character output setting value as recited in claims) is employed so as to determine an angle used to rotate a character. This parameter value employs anyone of the numerals "0" to "3." The rotation angles of the respective values are defined as follows:

0; no rotation,
1; a character is rotated by 90 degrees,
2; a character is rotated by 180 degrees, and
3; a character is rotated by 270 degrees.

(5) Value Used to Determine Font Size of Character:

This parameter value (corresponds to a character output setting value as defined in claims) is employed so as to determine a font size of a character. This parameter value employs an arbitrary integer corresponding to a point number.

(6) Value Used to Determine Either Color of Character or Background Color:

These parameter values (correspond to character output setting values as defined in claims) are employed so as to determine either a paint-over color of a character or a background color of a character. These parameter values employ integers selected from a range between 000 and 255 as to each of R, G, B colors.

(7) Value Used to Determine Font of Character;

This parameter value (corresponds to a character output setting value as recited in claims), and is employed so as to determine a font of a character. This parameter value employs a value corresponding to a font defined in a printer.

As explained above, the parameter functions of the statements for setting the output conditions of the character data belonging to the image data have been described.

Figure 5:
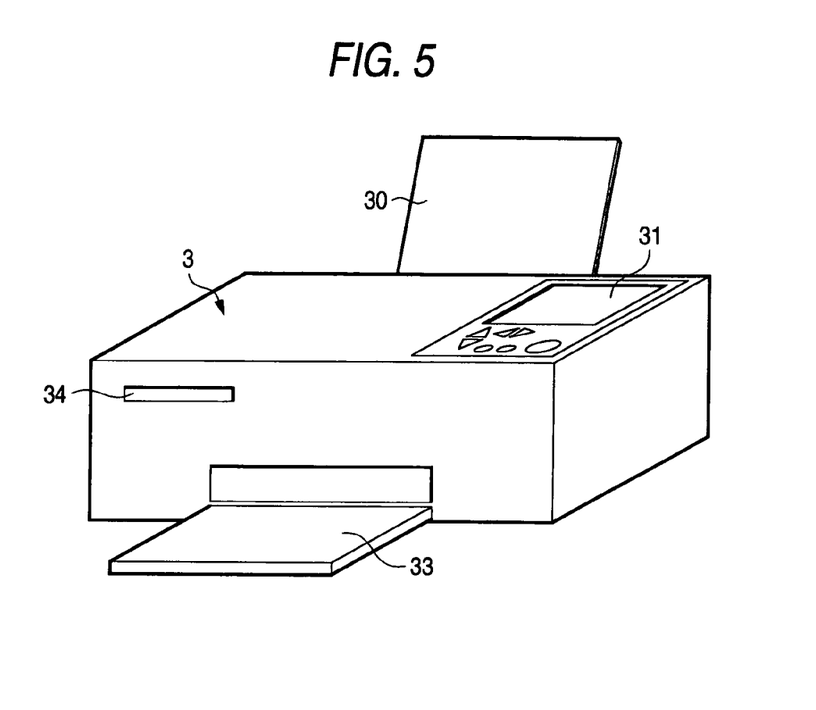
FIG. 5 is a perspective diagram for showing the printing apparatus according to the embodiment of the present invention.
Figure 6:
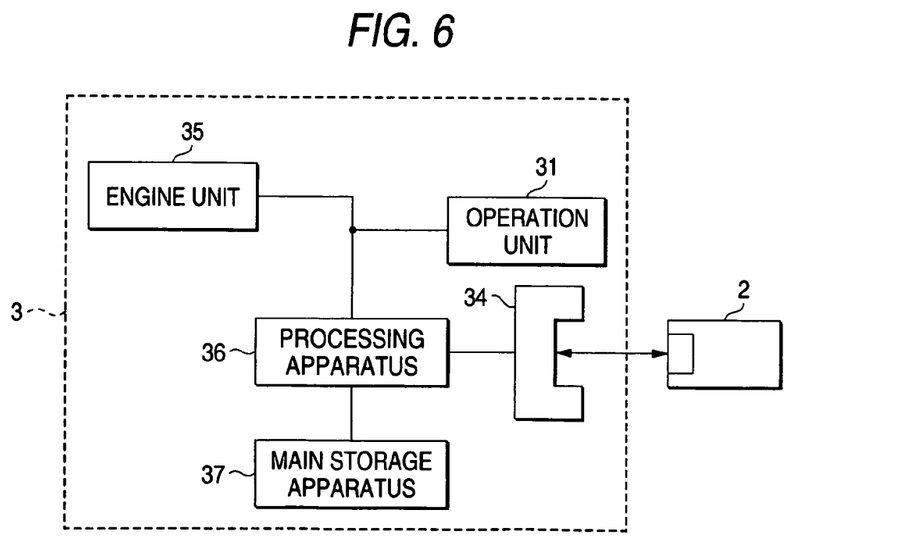
FIG. 6 is a block diagram for showing the printing apparatus according to the embodiment of the present invention.

Next, a description will now be made of the printing apparatus 3 for executing the setting program. FIG. 5 and FIG. 6 indicate the printing apparatus 3. The printing apparatus 3 is constituted by a processing apparatus 36, a main storage apparatus 37, a memory card reading apparatus 34, and-operation unit 31, and an engine unit 35.

Figure 7:
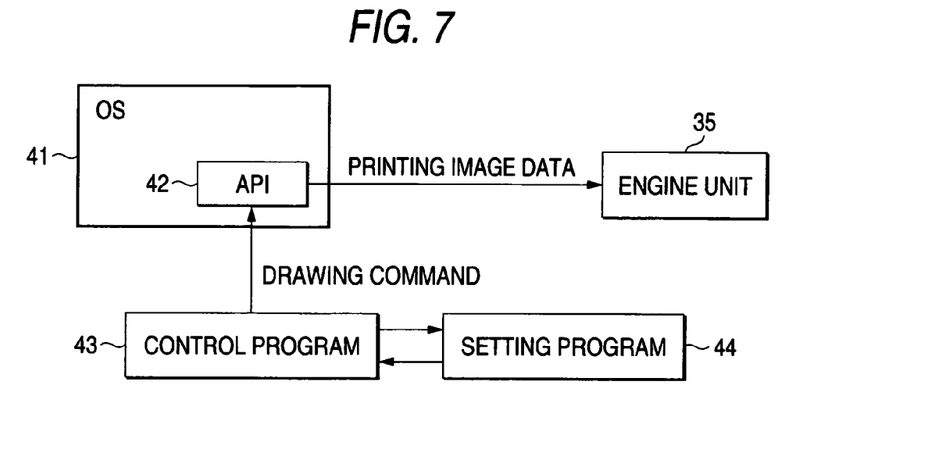
FIG. 7 is a block diagram for showing a structure of a program which is executed by a processing apparatus of the printing apparatus according to the embodiment of the present invention.

FIG. 7 shows a structure of a program executed by the processing apparatus 36. The processing apparatus 36 executes a control program 43 under management of an operating system 41, and reads out a setting program from the memory card 2 connected to the memory card reading apparatus 34 so as to execute this read setting program, so that this processing apparatus 36 stores into the main storage apparatus 37, both a parameter value of a statement for setting a printing frame and also another parameter value of a statement for setting an output condition of character data. The processing apparatus 36 produces printing image data based upon both image data and character data, which are read out from the second memory card 4 connected to the memory card reading apparatus 34, and then, stores this produced printing image data into the main storage apparatus 37. The processing apparatus 36 supplies both this printing image data and the printing condition to the engine unit 35 in order to control this engine unit 35. The operating system contains an API (Application Programming Interface) capable of producing printing image data from a drawing command produced by the control program.

The memory card reading apparatus 34 reads out electronic data recorded on a memory card.

Figure 8:
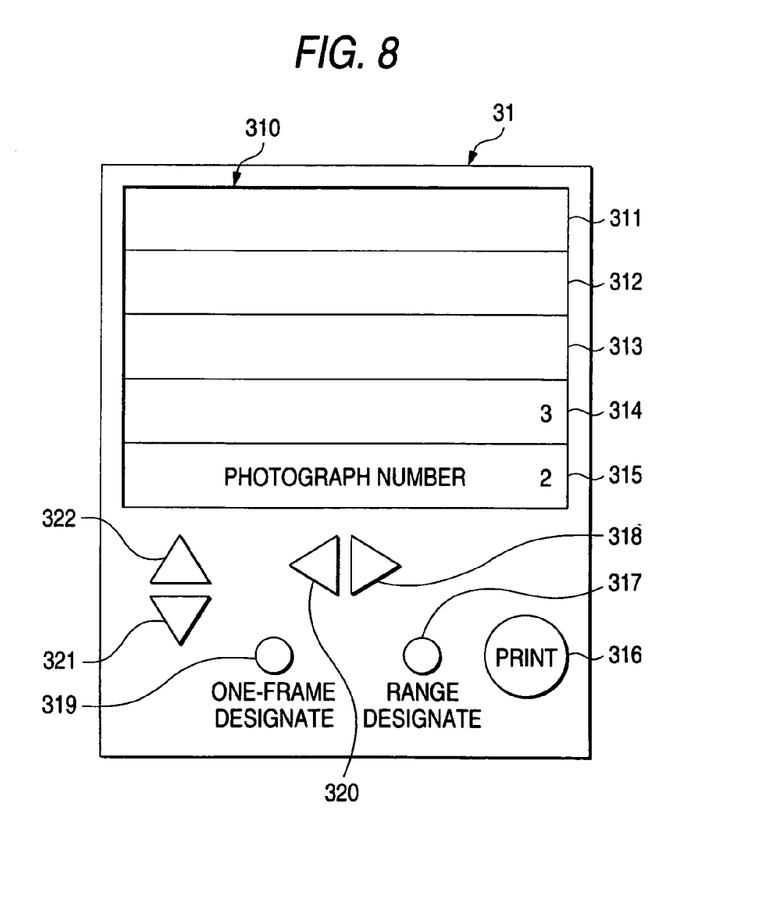
FIG. 8 is a plan view for showing an operation unit of the printing apparatus according to the embodiment of the present invention.

As shown in FIG. 8, the operation unit 31 is a selection value inputting apparatus provided with a switch 316 used to accept a print starting instruction, various sorts of switches 317 to 322 used to accept an input of a printing condition, and a liquid crystal display panel 310 for displaying thereon the printing condition. An entire area of the liquid crystal display panel 310 is subdivided into five sections 311 to 315. The printing condition such as a printing paper size and a printing quality is displayed on, for example, these sections 311 to 313.

Although not shown in this drawing, the engine unit 35 is provided with a paper transport mechanism, an ink jetting head, a head drive mechanism, a control board, and the like. The engine unit 35 receives both printing image data and a printing condition from the processing apparatus 37, and while this engine unit 35 transports a printing medium from a paper supply tray 30 to a paper eject tray 33, the engine unit 35 prints out an image based on both these accepted printing image data and printing condition. (The engine unit 35 corresponds to a printing unit as recited in claims.)

Next, a description will now be made of operations by the printing apparatus 3 in such a manner that this printing apparatus 3 reads a setting program, and outputs photographic image data recorded by a digital camera.

Reading of Setting Program

In the case that a memory card is connected to the memory card reading apparatus 34 and a setting program is stored in this memory card, this setting program is stored in the main storage apparatus 37. The processing apparatus 36 executes a statement described in the printing condition section P1 of the setting program, and calls a control program so as to set the printing condition to the engine unit 35. Next, the processing apparatus 36 commences to execute a statement described in the page section P2.

When the processing apparatus 36 executes both a statement used to set a reference printing frame, and a statement other than such a statement used to set an output condition of character data, a control program is called. Then, the control program issues a drawing command to the API of the operating system, and thus, such printing image data as a line segment, a rectangular shape, and a character is produced in the main storage apparatus 37.

Figure 1:
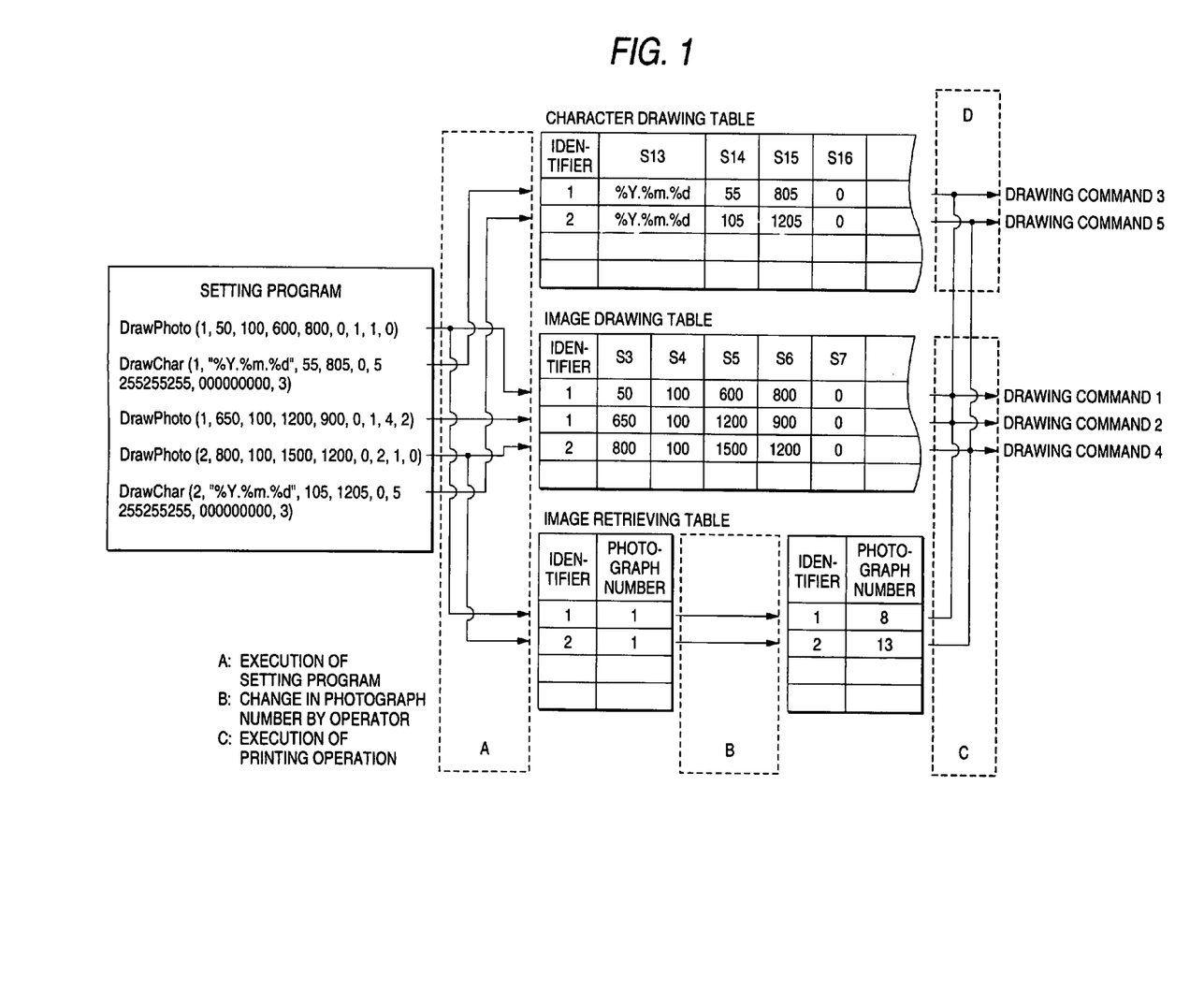
FIG. 1 is a schematic diagram for explaining operations of a printing apparatus according to an embodiment of the present invention.

Referring now to FIG. 1, a description will be made of operations by the processing apparatus 36 in the case that this processing apparatus 36 executes both the statement used to set the reference printing frame, and the statement used to set the output condition of the character data. It should be noted that contents of the process operations while these statements are executed are indicated by arrows which are surrounded by a broken line "A."

When the statement used to set the reference printing frame is executed, the control program is called, and then, the respective parameter values of this statement are added as one record into such an image drawing table having a field with respect to each sort of parameters every statement. (A set of data which are added into the image drawing table as one record corresponds to a portion of drawing data as recited in claims.) Every time a new output subject identifier appears in the statement for setting the reference printing frame, this newly appearing output subject identifier is added to an image retrieve table in combination with an initial value (namely, "1") of a photograph number under control of the control program. The image retrieve table contains a field of output subject identifiers and a field of photograph numbers. In this case, the photograph numbers correspond to such values which are recorded on a memory card in relation to the relevant image data as identifiers of image data when photographing operations are carried out by a digital camera.

When the statement used to set the output condition of the character data is executed, the control program is called, and then, the respective parameter values of this statement are added as one record into such a character drawing table having a field with respect to each sort of parameters every statement. (A set of data which are added into the character drawing table as one record corresponds to a portion of drawing data as recited in claims.) Every time a new output subject identifier appears in the statement for setting the output condition of the character data, this newly appearing output subject identifier is added to an image retrieve table in combination with an initial value (namely, "1") of a photograph number under control of the control program. The image retrieve table contains a field of output subject identifiers and a field of photograph numbers. It should be noted that since the statement used to set the printing frame is located in front of the statement used to set the output condition of the character data in the setting program shown in this drawing, the data storage into the image retrieve table by executing the statement used to set the output condition of the character data is not carried out.

Output of Image Data

In the case that a memory card is connected to the memory card reading apparatus 34 and image data is stored in this memory card, one image data, or more than two image data can be selected to be printed out. The image data is printed in accordance with the below-mentioned manner.

As a first description, a process operation capable of causing an operator to designate image data to be printed out will now be explained with reference to FIG. 1 and FIG. 8. Contents of this process operation are represented by arrows surrounded by a broken line "B."

The control program may display one output subject identifier on a section 314 of the liquid crystal display panel 310 based upon the image retrieve table, and may display such a photograph number corresponding to this output subject identifier on another section 315 thereof. A photograph number corresponding to an output subject identifier maybe specified based upon the image retrieve table. Any one of the sections 314 and 315 may become active by manipulating switches 321 and 322.

In the case that the section 314 becomes active, when depression of the switches 318 or 320 is detected, the control program changes such an output subject identifier which constitutes a subject for changing a photograph number. When the output subject identifier which constitutes the subject for changing the photograph number is changed, the control program causes this changed output subject identifier to be displayed on the section 314, and causes such a photograph number corresponding to this output subject identifier to be displayed on the section 315 based on the image retrieve table. It should be noted when only one record is stored in the image retrieve table, such an operation is not required by which the output subject identifier which constitutes the subject for changing the photograph number is selected.

In the case that the section 315 becomes active, when depression of the switch 318 or 320 is detected, the control program changes such a photograph number corresponding to an output subject identifier which constitutes a subject for changing a photograph number, and then, rewrites the image retrieve table.

Figure 9:
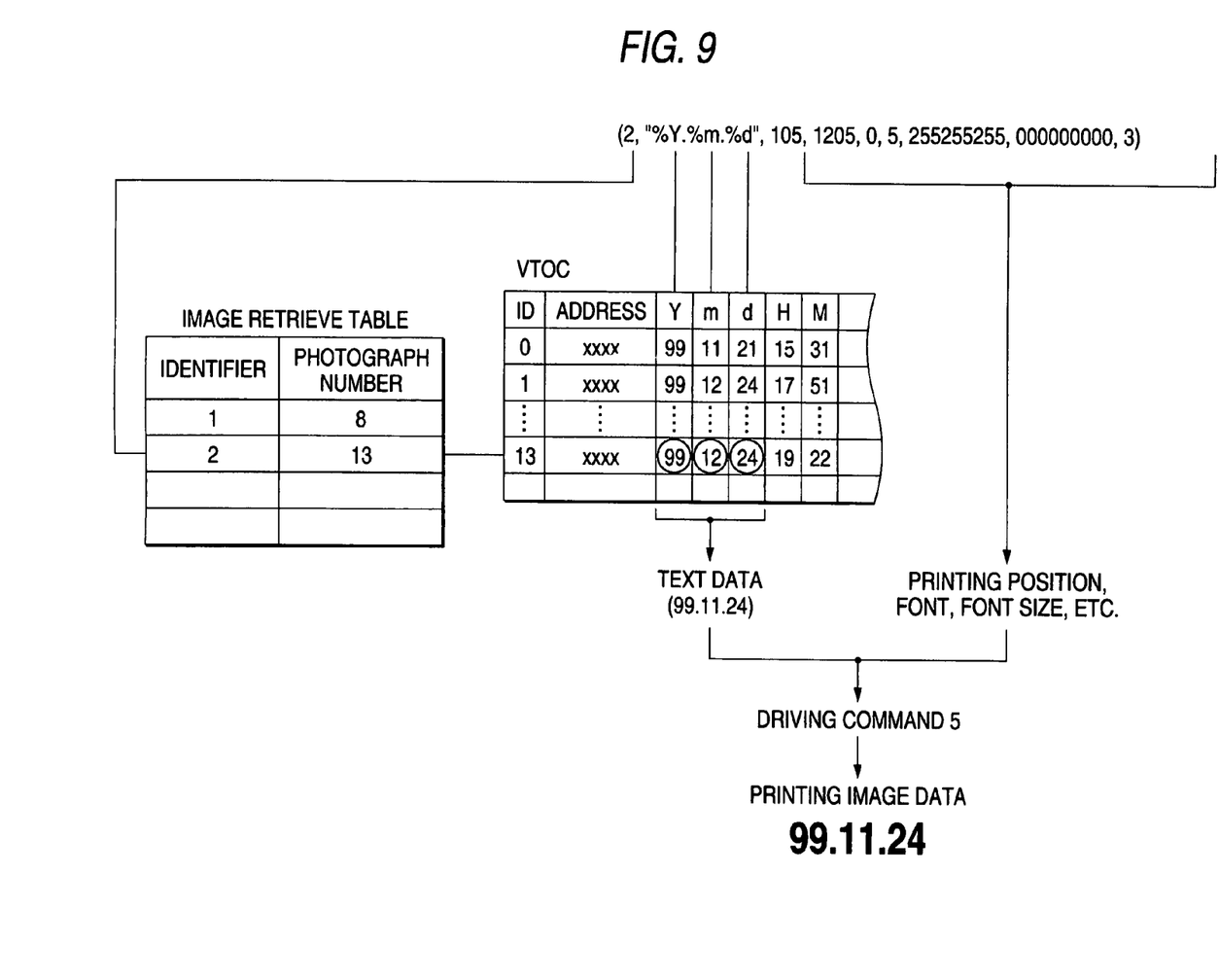
FIG. 9 is a schematic diagram for explaining operations of a printing apparatus according to an embodiment of the present invention.

Referring now to FIG. 1, FIG. 8, and FIG. 9, a description will be made of such a process operation that print image data is produced from both image data to be printed out and character data belonging to the image data, and then, the produced print image data is printed out. A content of this process operation is indicated by arrows which are surrounded by broken lines "C" and "D."

When a depression of the switch 316 is detected, the control program derives both an output subject identifier and a photograph number every 1 column from the image retrieve table, and also derives all of such records having the derived output subject identifier from both the image drawing table and the character drawing tale, and then, produces drawing commands from all of the derived records, respectively. As shown in FIG. 1, for example, in the case that both an output subject identifier 1 and a photograph number 8 are derived from a head column of the image retrieve table, two records having the output subject identifier 1 are derived from the image drawing table, so that both a drawing command 1 and another drawing command 2 are produced, and one record having the output subject identifier 1 is derived from the character drawing table so as to produce another drawing command 3. A series of such process operations is repeatedly carried out every time both the output subject identifier and the photograph number are derived in the unit of the column from the image retrieve table.

A detailed description will now be made of a content of a process operation executed when a drawing command is produced from the image drawing table. This content of the process operation is indicated by arrows which are surrounded by a broken line "C" of FIG. 1. The control program derives the respective values of the parameters of the statement for setting the reference printing frame every one record from the image drawing table, and specifies such a photograph number of image data which is used to produce printing image data by retrieving the image retrieve table, while the output subject identifier is employed as a retrieve key. The control program produces such a drawing command corresponding to the image data specified by the photograph number based upon the respective values of the parameters related to this image data, and issues this produced drawing command to the API of the operating system. The API may cause the printing image data to be produced in the main storage apparatus 37 based upon the drawing command.

Next, a detailed explanation will now be made of a content of a process operation executed when a drawing command is produced from the character drawing table. This content of the process operation is indicated by arrows which are surrounded by a broken line "D" of FIG. 1. FIG. 9 shows in detail, a content of such a process operation for issuing the drawing command 5 indicated in FIG. 1.

The control program derives the respective values of the parameters of the statement for setting the output condition of the character data from the drawing table, and specifies such a photograph number (ID) of character data which is used to produce printing image data by retrieving the image retrieve table, while the output subject identifier is employed as a retrieve key. In FIG. 9, a photograph number 13 is specified from an output subject identifier 2. The control program derives text data from such a field which is specified by a character string for determining a printing subject field with respect to a record of the corresponding photograph number of a volume content table (VTOC) of a memory card. It should also be noted that a volume content table (VTOC) is determined based upon a file system of a digital camera, and stores attribute information of image data therein, while a photograph number (ID) is employed as an entry, in addition to places of image data stored in a memory card. This attribute information corresponds to photographing day/time, shutter speeds, exposure values, and the like. In FIG. 9, text data "99", "12", and "24" are derived from the respective fields of a photographing year (Y), a photographing month (m), and a photographing day (d) of a record of a photograph number 13 from the volume content table.

The control program produces a drawing command based upon a value used to determine a printing position, a value used to determine a font, a value used to determine a font size, which are derived from a drawing table, and also based upon text data derived from the volume content table, and then, issues the drawing command to the API of the operating system. The API produces printing image data in the main storage apparatus 37 based upon the drawing command.

While the engine unit 35 transports paper from the paper supply tray 30 to the paper eject tray 33, this engine unit 35 prints out an image on a printing medium based upon both the printing image data and the printing condition.

As previously described, such an operation has been described in which the printing apparatus 3 reads the setting program, and prints out the image data which is recorded on the memory card by the digital camera. It should be noted that this embodiment has described that the printing image data is produced by issuing the drawing command to the API of the operating system by the control program. However, a work load allocation of the respective programs which are executed by a printer may be arbitrarily determined by a developing person.

In accordance with the printing apparatus 3, while the drawing command is produced based upon both the respective values of the parameters of the setting program and the output subject identifier, since the image data stored in the memory card is linked to the output subject identifier, such image data to be printed out may be arbitrarily designated in the setting program in which the output condition such as the printing reference frame is determined with respect to the unspecified image data. By executing the setting program, the output condition such as the layout of the image data which is designated during the printing operation can be previously set before the printing operation is commenced.

Further, in accordance with the printing apparatus 3, the photograph numbers corresponding to the identifiers of the image data are linked to the output subject identifiers based on the image retrieve table. As a consequence, according to this printing apparatus 3, the image data linked to the photograph number based upon the image retrieve table can be acquired from the memory card. Therefore, the repeated (duplicated) output subject identifier can be acquired, and a plurality of images can be printed out in accordance with one image data based upon the output setting values which are different from each other and are linked to the repeated output subject identifier.

In accordance with the printing apparatus 3, while employing the output subject identifier, the parameter used to determine the output condition of the image such as the coordinate of the reference printing frame, and the parameter used to determine the output condition of the character such as the character string determining the printing subject field, which are described in the setting program, both the output condition (layout of image data etc.) designated during the printing operation and the output conditions (printing position, font, font size etc.) of the character data belonging to the image data can be previously set before the image data to be outputted is designated. Since the image data which is linked to the output subject identifier in the image retrieve table can be acquired from the memory card, the repeated output subject identifier is acquired from the setting program. Therefore, a plurality of images can be printed out in accordance with one image data and the character data belonging to this image data based upon such a parameter used to determine the output conditions which are different from each other, and are linked to the repeated output subject identifier.

The invention claimed is:

1. A method of generating an instruction to be used in a printing operation, comprising:
    (a) selecting a first image stored in a first storage;
    (b) generating first relation information which relates a first identifier to a second identifier, the first relation information being stored in a second storage separated from the first storage,
        wherein the first identifier corresponds to a printing area of a printing medium, and
        wherein the second identifier identifies the first image; and
    (c) generating an instruction to be used in the printing operation based on the first relation information.

2. The method according to claim 1, further comprising:
    (d) generating second relation information so that the first identifier relates to a third identifier that identifies a second image; and
    (e) generating the instruction to be used in the printing operation based on the second relation information.

3. The method according to claim 2,
    wherein operation (b) comprises:
        (b1) generating the first relation information when the first image is to be printed in the printing operation, and
    wherein operation (c) comprises:
        (c1) generating the instruction to be used in the printing operation based on the first relation information when the first image is to be printed in the printing operation.

4. The method according to claim 3,
    wherein operation (d) comprises:
        (d1) generating the second relation information when the second image is to be printed in the printing operation, and
    wherein operation (e) comprises:
        (e1) generating the instruction to be used in the printing operation based on the second relation information when the second image is to be printed in the printing operation.

5. The method according to claim 4, wherein the second relation information is generated by modifying the first relation information.

6. The method according to claim 1, wherein the instruction to be used in the printing operation is generated in a printer.

7. An apparatus for generating an instruction to be used in a printing operation, comprising:
    a selection unit that selects a first image stored in a first storage; and
    a controller that generates first relation information which relates a first identifier to a second identifier, the first relation information being stored in a second storage separated from the first storage,
    wherein the first identifier corresponds to first printing area information of a printing medium,
    wherein the second identifier identifies the first image, and
    wherein the controller generates an instruction to be used in the printing operation based on the first relation information.

8. The apparatus according to claim 7, wherein the first printing area information identifies at least one of a size and a position on the printing medium.

9. The apparatus according to claim 8, wherein the first identifier is described in a first program,
    wherein the first program defines the first printing area information of the printing medium.

10. The apparatus according to claim 9, wherein the first identifier and the first printing area information are contained in at least one page of the first program.

11. The apparatus according to claim 7, wherein the first printing area information is first predetermined printing area information,
    wherein the first identifier identifies the first predetermined printing area information,
    wherein a third identifier identifies second predetermined printing area information,
    wherein the controller generates the first relation information which relates the first identifier to the second identifier, and
    wherein the controller generates second relation information which relates the third identifier to a fourth identifier that identifies a second image.

12. The apparatus according to claim 11, wherein the first identifier and the third identifier are described in a first program,
    wherein the first identifier and the first printing area information are contained in a first page of the first program, and
    wherein the third identifier and the second printing area information are contained in a second page of the first program.

13. The apparatus according to claim 7, wherein the first identifier corresponds to at least one character value that identifies at least one property of text information to be printed during the printing operation.

14. The method according to claim 7, wherein the first printing area information identifies allocation information as to the first image to be arranged on the first area.

15. A method of generating an instruction to be used in a printing operation, comprising:
    reading relation information which relates a first identifier to information concerning a first image from a first storage,
    wherein the first identifier corresponds to first area information concerning a first area of a printing medium on which the first image is to be arranged;

acquiring the image data for the first image from a second storage separated from the first storage based on the relation information; and generating an instruction to print based on the image data and the relation information.

16. The method according to claim 15, further comprising:

changing the relation information so that information of a second image is related to the first identifier; and generating an instruction to print based on the changed relation information.

17. A method of generating an instruction to be used in a printing operation, comprising:

reading relation information which relates a first identifier to information concerning a first image, wherein the first identifier corresponds to first area information concerning a first area of a printing medium on which the first image is to be arranged;

acquiring the image data for the first image based on the relation information; and generating an instruction to print based on the image data and the relation information, wherein the relation information relates the information concerning the first image to the first identifier and relates the information concerning the first image to a second identifier, wherein the second identifier corresponds to second area information, wherein the second area information concerns a second area of a printing medium on which the first image is to be arranged, and wherein the instruction to print causes the first image to be arranged on at least the first area and the second area of the print medium.

18. An apparatus comprising:

a selecting unit that selects a first image from a first storage as a selected image;

an input unit that acquires first area information concerning a first area of a printing medium on which the selected image is to be arranged, wherein a first identifier corresponds to the first area information; and a controller that generates first relation information which relates the first identifier to an image identifier of the selected image, wherein the controller acquires image data from a second storage separated from the first storage, which is identified by the image identifier of the selected image, based on the first relation information, and wherein the controller generates an instruction to print based on the acquired image data and the first relation information.

19. The apparatus according to claim 18, wherein the controller changes the first relation information to second relation information so that an image identifier of a second image is related to the first identifier, and wherein the controller generates an instruction to print based on the second relation information.

20. The apparatus according to claim 18, wherein the first area information comprises a position and a size on the first area of the printing medium.

21. An apparatus comprising:

a reading unit that reads relation information which relates a first identifier to information concerning a first image from a first storage, wherein the first identifier corresponding to first area information concerning a first area of a printing medium on which the first image is to be arranged;

an image data acquiring unit that acquires the image data for the first image from a second storage separated from the first storage based on the relation information; and a controller that generates an instruction to print based on the acquired image data and the relation information.

22. The apparatus according to claim 21, wherein the relation information is changed so that information of a second image is related to the first identifier, and an instruction to print is generated based on the changed relation information.

23. The apparatus according to claim 21, wherein the first area information identifies allocation information as to the first image to be arranged on the first area.

24. An apparatus comprising:

a reading unit that reads relation information which relates a first identifier to information concerning a first image, wherein the first identifier corresponding to first area information concerning a first area of a printing medium on which the first image is to be arranged;

an image data acquiring unit that acquires the image data for the first image based on the relation information; and a controller that generates an instruction to print based on the acquired image data and the relation information, wherein the relation information relates the information concerning the first image to the first identifier and relates the information concerning the first image to a second identifier, wherein the second identifier corresponds to second area information, wherein the second are information concerns a second area of a printing medium on which the first image is to be arranged, and wherein the instruction to print causes the first image to be arranged on at least the first area and the second area of the print medium.

25. A method of generating an instruction to be used in a printing operation, the method comprising:

selecting and image;

generating relation information which relates a first identifier and a second identifier to a third identifier, wherein the first identifier corresponds to a first printing area of a printing medium, and the second identifier corresponds to a second printing area of the printing medium, and wherein the third identifier identifies the image; and generating an instruction to be used in the printing operation based on the relation information, wherein the instruction causes the image to be arranged on at least the first area and the second area of the print medium.

26. An apparatus for generating an instruction to be used in a printing operation, the apparatus comprising:

a selection unit that selects an image; and a controller that generates relation information which relates a first identifier and a second identifier to a third identifier, wherein the first identifier corresponds to first printing area information of a printing medium, and the second identifier corresponds to second printing area information of the printing medium, wherein the third identifier identifies the image, and wherein the controller generates an instruction to be used in the printing operation based on the relation information wherein the instruction causes the image to be arranged on at least the first area and the second area of the print medium.

* * * * *